US012413588B2

(12) United States Patent
Sanchez Rola

(10) Patent No.: US 12,413,588 B2
(45) Date of Patent: Sep. 9, 2025

(54) SYSTEMS AND METHODS FOR DYNAMICALLY GENERATING FINGERPRINT SIGNATURES

(71) Applicant: GEN DIGITAL INC., Tempe, AZ (US)

(72) Inventor: Iskander Sanchez Rola, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 124 days.

(21) Appl. No.: 18/509,954

(22) Filed: Nov. 15, 2023

(65) Prior Publication Data

US 2025/0047669 A1  Feb. 6, 2025

(51) Int. Cl.
*G06F 7/04* (2006.01)
*H04L 9/40* (2022.01)

(52) U.S. Cl.
CPC .............. *H04L 63/0876* (2013.01)

(58) Field of Classification Search
CPC ...... G06F 21/44; G06F 21/554; G06F 21/577; G06F 21/60; G06F 21/6263; H04L 63/0876; H04W 12/02
See application file for complete search history.

(56) References Cited

U.S. PATENT DOCUMENTS

| | | | |
|---|---|---|---|
| 5,974,455 A * | 10/1999 | Monier ............... | G06F 16/9014 709/217 |
| 9,514,312 B1 * | 12/2016 | Antoun ................. | G06F 16/152 |
| 10,628,630 B1 * | 4/2020 | Surace .................... | H04L 67/02 |
| 12,019,785 B2 * | 6/2024 | Bennett ............... | H04L 63/0407 |
| 2004/0128515 A1 * | 7/2004 | Rabin ................. | G06F 21/1064 380/231 |
| 2018/0114000 A1 * | 4/2018 | Taylor ................... | H04L 9/0643 |
| 2021/0203694 A1 * | 7/2021 | Paquet ................ | H04L 63/1483 |

OTHER PUBLICATIONS

Sedaghat et al, A Dynamic Web Agent for Verifying the Security and Integrity of a Web Site's Contents, IEEE, Jul. 14, 2001, pp. 330-337. (Year: 2001).*
Sjosten et al, EssentialIFP: Exposing the Essence of Browser Fingerprinting, IEEE, Sep. 10, 2021, pp. 32-48. (Year: 2021).*

* cited by examiner

*Primary Examiner* — Philip J Chea
*Assistant Examiner* — Jenise E Jackson
(74) *Attorney, Agent, or Firm* — Greenberg Traurig, LLP

(57) ABSTRACT

A computer-implemented method for dynamically generating fingerprint signatures may include (i) detecting data associated with fingerprinting functions called in a target web page, (ii) associating, based on the data, fingerprints generated by the fingerprinting functions with a corresponding action, (ii) identifying, based on the data, callee information associated with each of the fingerprinting functions, and (iv) performing a security action that protects against malicious activity by calculating a cryptographic hash of a list including the fingerprinting functions and the corresponding actions to generate a fingerprint signature for the target web page. Various other methods, systems, and computer-readable media are also disclosed.

20 Claims, 7 Drawing Sheets

SYSTEMS AND METHODS FOR DYNAMICALLY GENERATING FINGERPRINT SIGNATURES

CROSS REFERENCE TO RELATED APPLICATION

This application claims the benefit of European Patent Application No. EP23306313.0, filed Jul. 31, 2023. The disclosure of this application is hereby incorporated, by reference, in its entirety.

BACKGROUND

Computing device users are increasingly being targeted by sophisticated attacks that capture device and browser fingerprints in malicious websites for a variety of nefarious activities. For example, cybercriminals may reuse stolen browser fingerprint code when creating malicious web pages multiple potential victims and across multiple categories for performing cloaking (e.g., deceiving users into disclosing private data by presenting different/targeted web page content). Additionally or alternatively, captured fingerprints may be sold along with stolen user credentials for enabling other malicious actors to bypass authentication checks, such as two-factor authentication.

Traditional approaches utilized by threat protection software for protecting against attacks performed utilizing malicious web pages fail to provide methods for detecting the misuse of browser and device fingerprint code. As a result, these approaches often fail to collect sufficient data for analyzing malicious campaigns carried out by threat actors or detect associated web pages utilized by these actors for malicious purposes.

SUMMARY

As will be described in greater detail below, the present disclosure describes various systems and methods for dynamically generating fingerprint signatures.

In one example, a method for dynamically generating fingerprint signatures may include (i) detecting, by one or more computing devices data associated with fingerprinting functions called in a target web page, (ii) associating, based on the data, fingerprints generated by the fingerprinting functions with a corresponding action, (ii) identifying, based on the data, callee information associated with each of the fingerprinting functions, and (iv) performing a security action that protects against malicious activity by calculating a cryptographic hash of a list including the fingerprinting functions and the corresponding actions to generate a fingerprint signature for the target web page. Examples of malicious activity may include malicious fingerprinting or other web-based threats (such as malware, phishing, and scams) where the security action may protect against these threats by identifying matching fingerprint signatures utilized in attacks corresponding to the aforementioned threats.

In some examples, the data associated with the fingerprinting functions may be detected by detecting hypertext markup language (HTML) elements associated with the fingerprinting functions and/or HTML objects associated with the fingerprinting functions. Additionally or alternatively, the fingerprinting functions may be detected by tracking one or more application programming interfaces (APIs) utilized by the fingerprinting functions to dynamically modify the target web page. Additionally or alternatively, the fingerprinting functions may be detected by utilizing a dynamically generated resource tree for finding a connection between scripts in the target web page.

In some examples, associating the fingerprints with the corresponding actions may include identifying a target function that utilizes any of the fingerprints for a content manipulation action and associating the target function with the content manipulation action. Additionally or alternatively, associating the fingerprints with the corresponding actions may include identifying a target function that utilizes any of the fingerprints for a redirection action and associating the target function with the redirection action. Additionally or alternatively, associating the fingerprints with the corresponding actions may include identifying a target function that performs a storage action for any of the fingerprints and associating the target function with the storage action. Additionally or alternatively, associating the fingerprints with the corresponding actions may include identifying a target function that performs an action for sending any of the fingerprints within a request parameter and associating the target function with the action.

In some examples, the callee information may be identified by determining a domain name associated with a third-party callee. Additionally or alternatively, the callee information may be identified by determining (and marking) a first party-callee.

In some examples, the malicious activity may include a cloaking operation that delivers new content to a user of the target web page that is different than native content associated with the target web page. In other examples, the malicious activity may include other web-based threats such as malware, phishing, and scam attacks (where the security action may protect against these threats by identifying matching fingerprint signatures utilized in the attacks). In some examples, the fingerprint signature may be a device fingerprint signature or a browser fingerprint signature generated by one or more of a web browser, a browser extension, or a backend server web crawler.

In one embodiment, a system for dynamically generating fingerprint signatures may include at least one physical processor and physical memory that includes computer-executable instructions and set of modules that, when executed by the physical processor, cause the physical processor to (i) detect, by a detection module, data associated with one or more fingerprinting functions called in a target web page, (ii) associate, by an association and based on the data, each of one or more fingerprints generated by the fingerprinting functions with a corresponding action, (iii) identify, by an identification module and based on the data, callee information associated with each of the fingerprinting functions, and (iv) perform, by a security module, a security action that protects against malicious activity by calculating a cryptographic hash of a list including the fingerprinting functions and the corresponding actions to generate a fingerprint signature for the target web page.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect data associated with one or more fingerprinting functions called in a target web page, (ii) associate, based on the data, each of one or more fingerprints generated by the fingerprinting functions with a corresponding action, (iii) identify, based on the data, callee information associated with each of the fingerprinting functions, and (iv) perform a security action that protects against malicious activity by calculating a cryptographic hash of a list including the fingerprinting functions and the corresponding actions to generate a fingerprint signature for the target web page.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
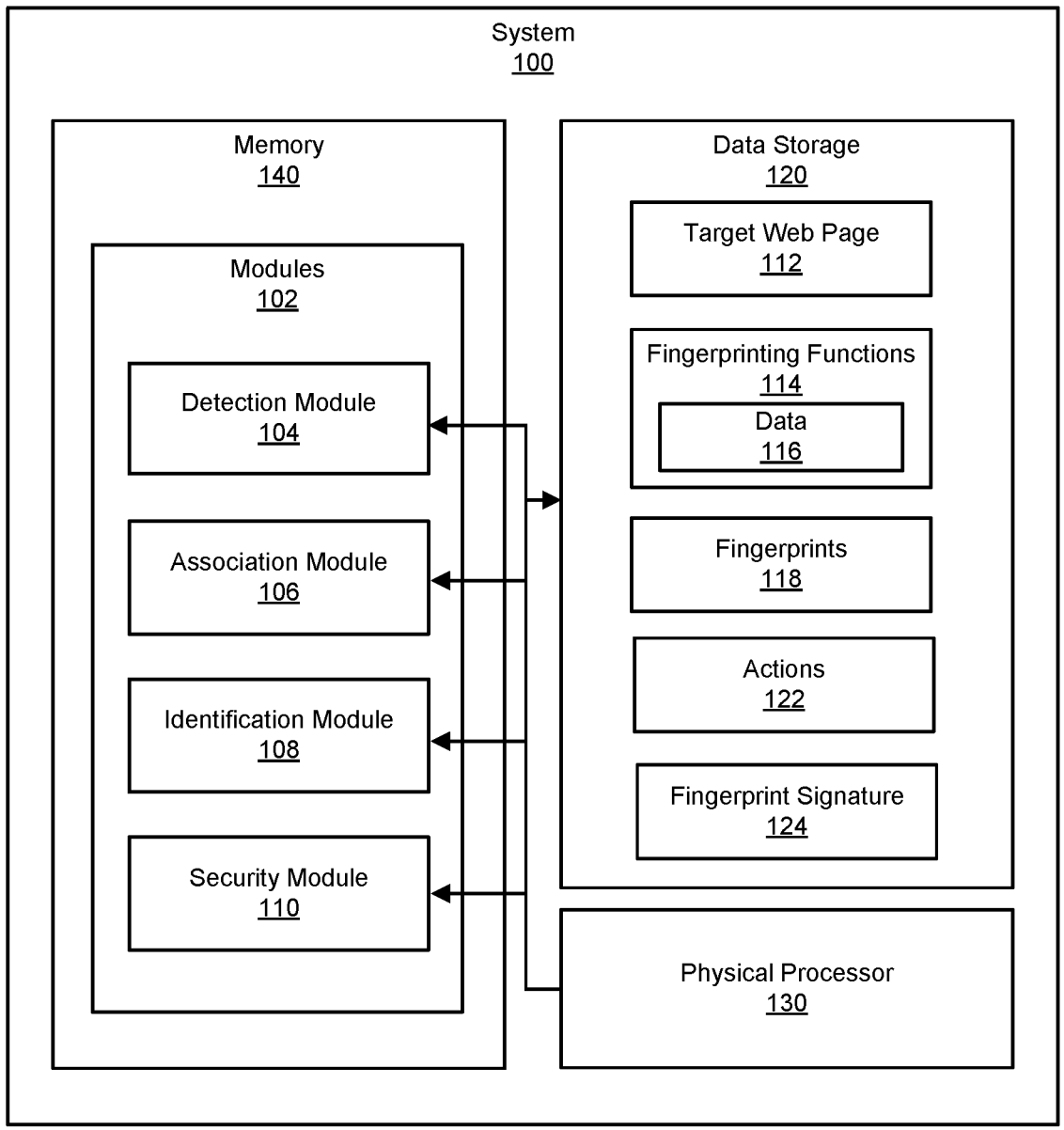
FIG. 1 is a block diagram of an example system for dynamically generating fingerprint signatures.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for dynamically generating fingerprint signatures. As will be described in greater detail below, the systems and methods described herein may collect data about fingerprinting functions in web pages, track APIs that can be used to dynamically the fingerprinting functions, and check a web page hierarchy by utilizing a dynamically generated resource tree to find connections between scripts associated with the fingerprinting functions. Additionally, the systems and methods described herein may associate the fingerprinting functions based on their associated intentions/actions such as (i) the utilization of fingerprints for content manipulation/redirection and (ii) the storing of fingerprints in web cookies (or other storage) or the sending of the fingerprints within request parameters. Additionally, the systems and methods described herein may, for generating precise fingerprinting signatures, incorporate information about the callee of the fingerprinting functions, such as including the associated domain name for third-party callees, and further incorporate the order of the actions and the relationship between the actions. Finally, the systems and methods herein may compute a cryptographic hash of an ordered list of the fingerprinting functions (along with their corresponding parameter pairs) to generate the fingerprinting signatures. By generating fine-grained fingerprinting signatures in this way, the detection of malicious web pages that reuse fingerprinting code (e.g., by bypassing authentication checks) for multiple targets and across multiple categories (e.g., malicious cyber campaigns carried out by hacker group clusters) may be realized.

In addition, the systems and methods described herein may improve the technical field of computing device security by protecting against malicious attacks designed to bypass traditional security protections, such as two-factor authentication, for protecting private user data (e.g., digital user credentials).

Figure 2:
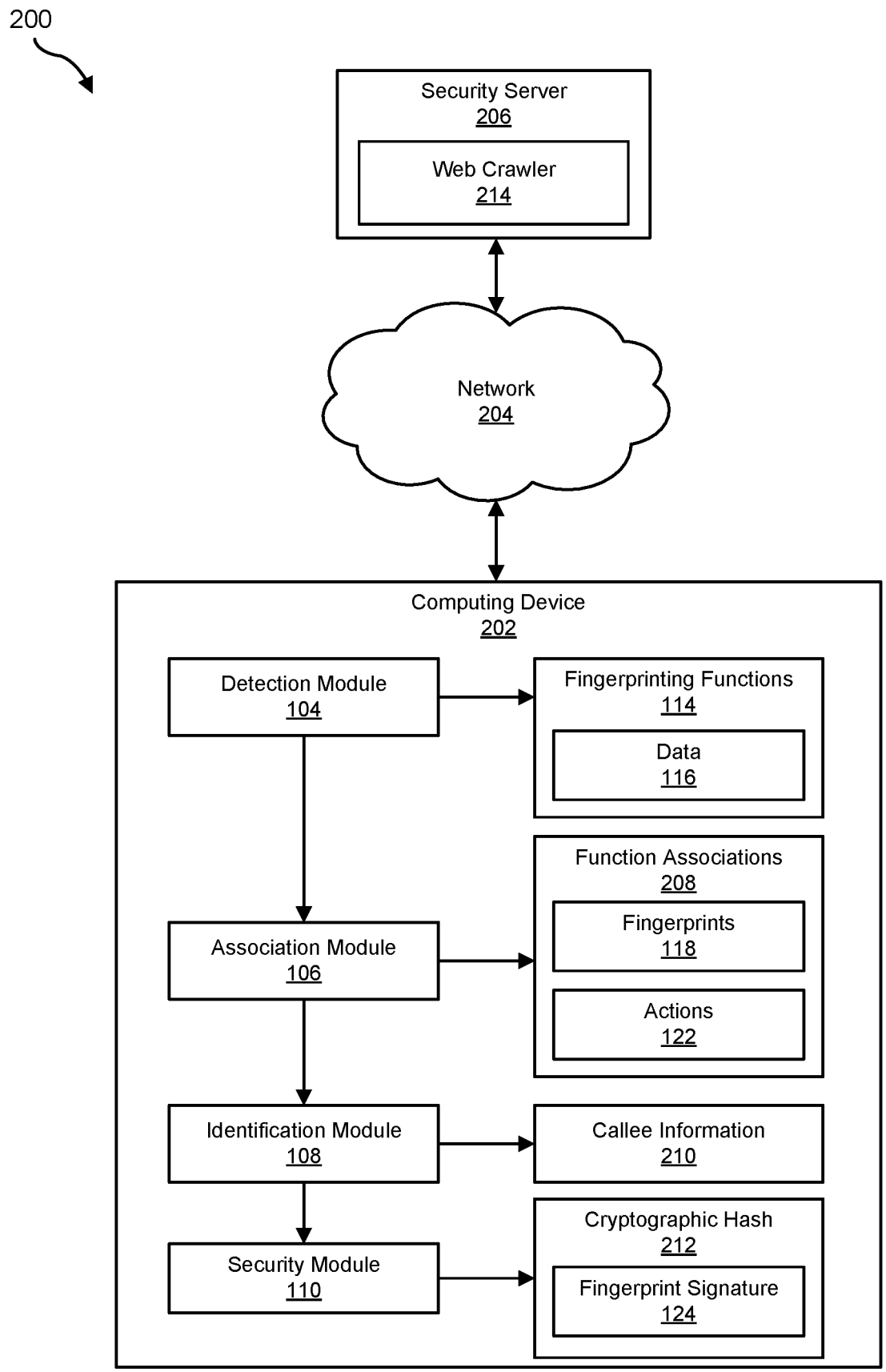
FIG. 2 is a block diagram of an additional example system for dynamically generating fingerprint signatures.

The following will provide, with reference to FIGS. 1-2, detailed descriptions of example systems for dynamically generating fingerprint signatures. Detailed descriptions of corresponding computer-implemented methods will also be provided in connection with FIG. 3. In addition, a detailed description of example fingerprinting function data utilized in the example systems of FIGS. 1 and 2, will also be provided in connection with FIG. 4. In addition, a detailed description of example fingerprinting function actions utilized in the example systems of FIGS. 1 and 2, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for dynamically generating fingerprint signatures. As illustrated in this figure, example system 100 may include one or more modules 102 for performing one or more tasks. As will be explained in greater detail below, modules 102 may include a detection module 104 that detects data 116 associated with fingerprinting functions 114 called in a target web page 112. Example system 100 may additionally include an association module 106 that associate, based on data 116, fingerprints 118 generated by fingerprinting functions 114 with actions 122 (e.g., a corresponding action). Example system 100 may also include an identification module 108 that identifies, based on data 116, callee information associated with fingerprinting functions 114. Example system 100 may additionally include a security module 110 that performs a security action that protects against malicious activity by calculating a cryptographic hash of a list including fingerprinting functions 114 and actions 122 to generate a fingerprint signature 124 for target web page 112. Although illustrated as separate elements, one or more of modules 102 in FIG. 1 may represent portions of a single module or application.

The term "fingerprinting functions" as used herein, generally refers to any function (e.g., scripts) utilized for generating browser or device fingerprints containing information for identifying users during web browsing sessions. For example, when a user visits a web page, a website may be configured to execute a script for calling an API (e.g., HTMLCanvasElement) that returns encoded pixel data for serving as a user fingerprint during user browsing sessions.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically generating fingerprint signatures. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store target web page 112, fingerprinting functions 114, data 116, fingerprints 118, actions 122, and fingerprint signature 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with security server 206 via a network 204. In one example, all or a portion of the functionality of modules 102 may be performed by computing device 202, security server 206, and/or any other suitable computing system. As will be described in greater detail below, one or more of modules 102 from FIG. 1 may, when executed by at least one processor of computing device 202 and/or security server 206, enable computing device 202 and/or security server 206 to dynamically generate fingerprint signatures. For example, and as will be described in greater detail below, detection module 104, association module 106, identification module 108, and security module 110, may cause computing device 202 and/or backend server 206 to (i) detect data 116 associated with fingerprinting functions 114 called in target web page 112, (ii) associate, based on data 116, fingerprints 118 generated by fingerprinting functions 114 with actions 122, (iii) identify, based data 116, callee information 210 associated with fingerprinting functions 114, and (iv) perform a security action that protects against malicious activity by calculating cryptographic hash 212 of a list including fingerprinting functions 114 and actions 122 to generate fingerprint signature 124 for target web page 112.

Computing device 202 generally represents any type or form of computing device capable of reading and/or executing computer-executable instructions. In some examples, computing device 202 may represent an endpoint device running client-side security software including a browser application or browser extension viewing and accessing websites. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Security server 206 generally represents any type or form of computing device that is capable of reading and/or executing computer-executable instructions. In some examples, security server 206 may represent a backend server computing device, running web crawler 214, that provides threat protection services for web browsers. Additional examples of security server 206 include, without limitation, application servers, web servers, storage servers, and/or database servers configured to run certain software applications and/or provide various security, web, storage, and/or database services. Although illustrated as a single entity in FIG. 2, security server 206 may include and/or represent a plurality of servers that work and/or operate in conjunction with one another.

Network 204 generally represents any medium or architecture capable of facilitating communication or data transfer. In one example, network 204 may facilitate communication between computing device 202 and security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
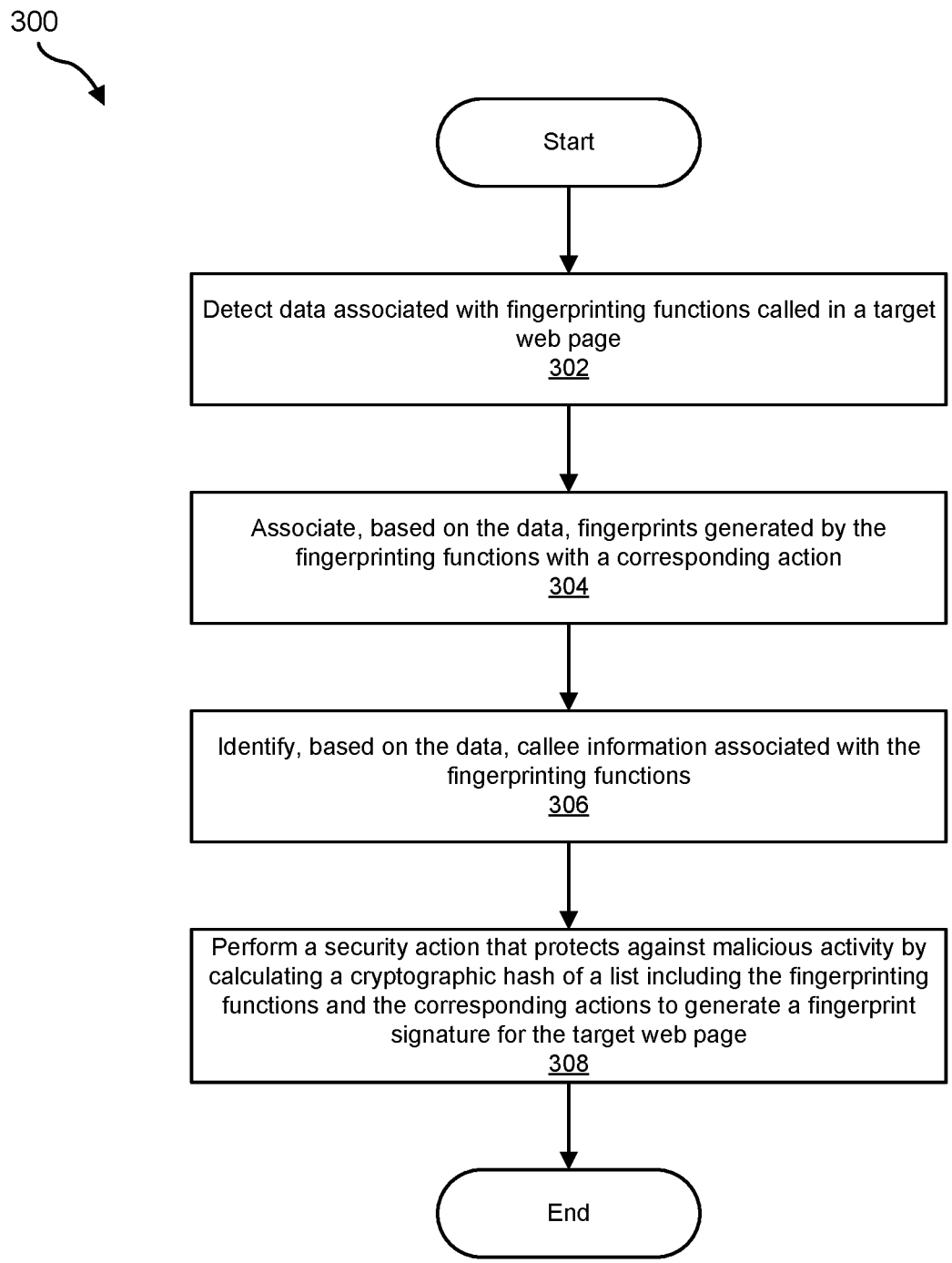
FIG. 3 is a flow diagram of an example method for dynamically generating fingerprint signatures.

FIG. 3 is a flow diagram of an example computer-implemented method 300 for dynamically generating fingerprint signatures. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

Figure 4:
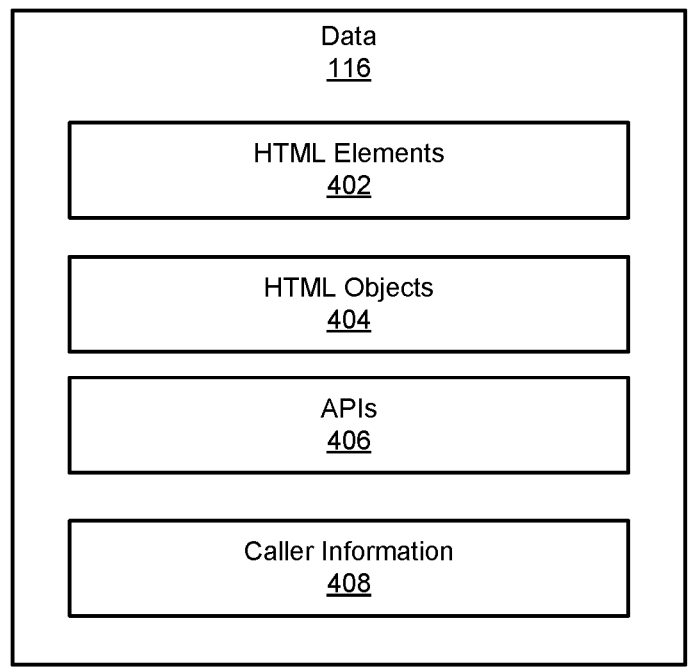
FIG. 4 is a block diagram of example fingerprinting function data utilized in the example systems of FIGS. 1 and 2.

As illustrated in FIG. 3, at step 302 one or more of the systems described herein may detect data associated with fingerprinting functions called in a target web page. For example, detection module 104 may, as part of computing device 202 in FIG. 2, detect data 116 associated with fingerprinting functions 114 called in target web page 112. In some examples, and as shown in FIG. 4, data 116 may include HTML elements 402, HTML objects 404, APIs 406, and caller information 408 (e.g., first or third-party scripts utilized for calling fingerprinting functions 114).

Detection module 104 receive may detect data 116 in a variety of ways. In some examples, detection module 104 may collect information in HTML elements 402 (e.g., HTMLCanvasElement) and HTML objects 404 (e.g., RTCPeerConnection object) associated with the fingerprinting functions 114. Additionally or alternatively, detection module 104 may track APIs 406 that may be utilized to dynamically modify target web page 112 (e.g., Element.ReplaceChild and Node.insertBefore). Additionally or alternatively, detection module 104 may track caller information 408 (e.g., first-party or third-party scripts that call fingerprinting functions 114. Moreover, in some examples, detection module 104 ma check a page hierarchy of target web page 112 by utilizing a dynamically generated resource tree to find a connection between the aforementioned scripts.

Figure 5:
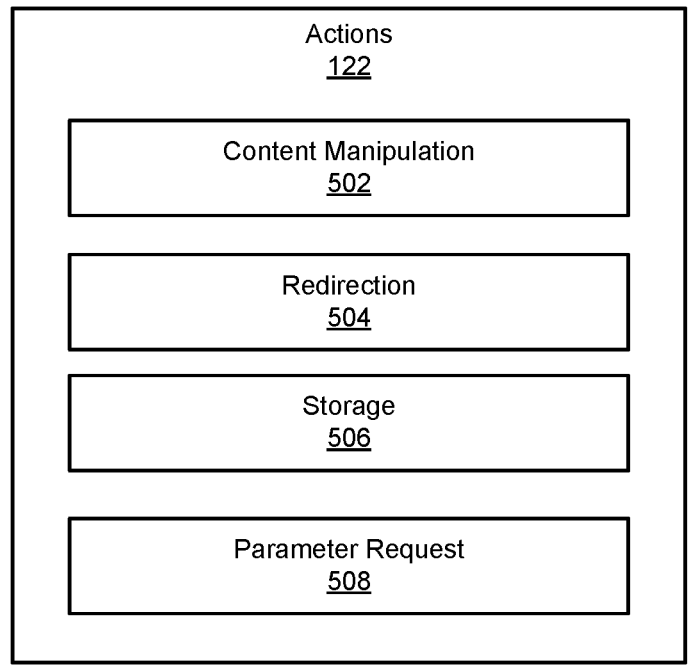
FIG. 5 is a block diagram of example fingerprinting function actions utilized in the example systems of FIGS. 1 and 2.

At step 304, one or more of the systems described herein may associate, based on the data detected at step 302, fingerprints generated by the fingerprinting functions with a corresponding action. For example, association module 106 may, as part of computing device 202 in FIG. 2, associate fingerprints 118 with one or more actions 122 based on data 116. In some examples, and as shown in FIG. 5, actions 122 may include content manipulation 502, redirection 504, storage 506, and parameter request 508.

Association module 106 may associate fingerprints 118 with actions 122 in a variety of ways. In some examples, association module 106 may identify a fingerprinting function 114 that utilizes a fingerprint 118 for content manipulation 502 and then associate fingerprinting function 114 with content manipulation 502. Additionally or alternatively, association module 106 may identify a fingerprinting function 114 that utilizes a fingerprint 118 for redirection 504 (e.g., redirecting a user of target web page 112 to another web page) and then associate fingerprinting function 114 with redirection 504. Additionally or alternatively, association module 106 may identify a fingerprinting function 114 that performs storage 506 and then associate fingerprinting function 114 with storage 506. In this example, a fingerprinting function 114 may be configured to store fingerprints 118 in either HTTP cookies (e.g., web browser cookies) or another device storage utilized by computing device 202. Additionally or alternatively, association module 106 may identify a fingerprinting function 114 that performs parameter request 508 and then associate fingerprinting function 114 with parameter request 508. In this example, a fingerprinting function 114 may be configured to send fingerprints 118 in within parameters of requests. In some embodiments, association module 106 may associate a specific set of actions 122 performed in each of the aforementioned examples including the types of data (e.g., data 116).

At step 306, one or more of the systems described herein may identify, based on the data detected at step 302, callee information associated with the fingerprinting functions. For example, identification module 106 may, as part of computing device 202 in FIG. 2, identify callee information 210 based on data 116.

Identification module 108 may identify callee information 210 in a variety of ways. In some examples, identification module 108 may identify callee information 210 by determining a domain name associated with a third-party callee. For example, identification module 108 (in order to increase the precision of a generated fingerprint signature 124), may include a domain of a third-party callee of a fingerprinting function 114 in a data structure (e.g., canvasrenderingcontext2d.measureText, domain.com.). In some examples, upon identifying a first-party callee from callee information 210, identification module 108 may identify (e.g., mark) the first-party callee as "first."

At step 308, one or more of the systems described herein may perform a security action that protects against malicious activity by calculating a cryptographic hash of a list including the fingerprinting functions and the corresponding actions to generate a fingerprint signature for the target web page. For example, security module 110 may, as part of computing device 202 in FIG. 2, calculate cryptographic hash 212 to generate fingerprint signature 124.

Security module 110 may generate fingerprint signature 124 in a variety of ways. In some examples, security module 110 may compute a hash of a list of ordered fingerprinting functions 114 and corresponding parameter pairs (e.g., parameter pairs in parameter request 508). In one example, fingerprinting functions 114 may be ordered based on an order of actions 122 that are performed and the relationship between each action 122.

As explained in connection with method 300 above, the systems and methods described herein dynamically generating fingerprint signatures. The systems and methods described herein may collect data about fingerprinting functions in web pages, track APIs that can be used to dynamically the fingerprinting functions, and check a web page hierarchy by utilizing a dynamically generated resource tree to find connections between scripts associated with the fingerprinting functions. Additionally, the systems and methods described herein may associate the fingerprinting functions based on their associated intentions/actions such as (i) the utilization of fingerprints for content manipulation/redirection and (ii) the storing of fingerprints in web cookies (or other storage) or the sending of the fingerprints within request parameters. Additionally, the systems and methods described herein may, for generating precise fingerprinting signatures, incorporate information about the callee of the fingerprinting functions, such as including the associated domain name for third-party callees, and further incorporate the order of the actions and the relationship between the actions. Finally, the systems and methods herein may compute a cryptographic hash of an ordered list of the fingerprinting functions (along with their corresponding parameter pairs) to generate the fingerprinting signatures. By generating fine-grained fingerprinting signatures in this way, the detection of malicious web pages that reuse fingerprinting code (e.g., by bypassing authentication checks) for multiple targets and across multiple categories (e.g., malicious cyber campaigns carried out by hacker group clusters) may be realized.

Figure 6:
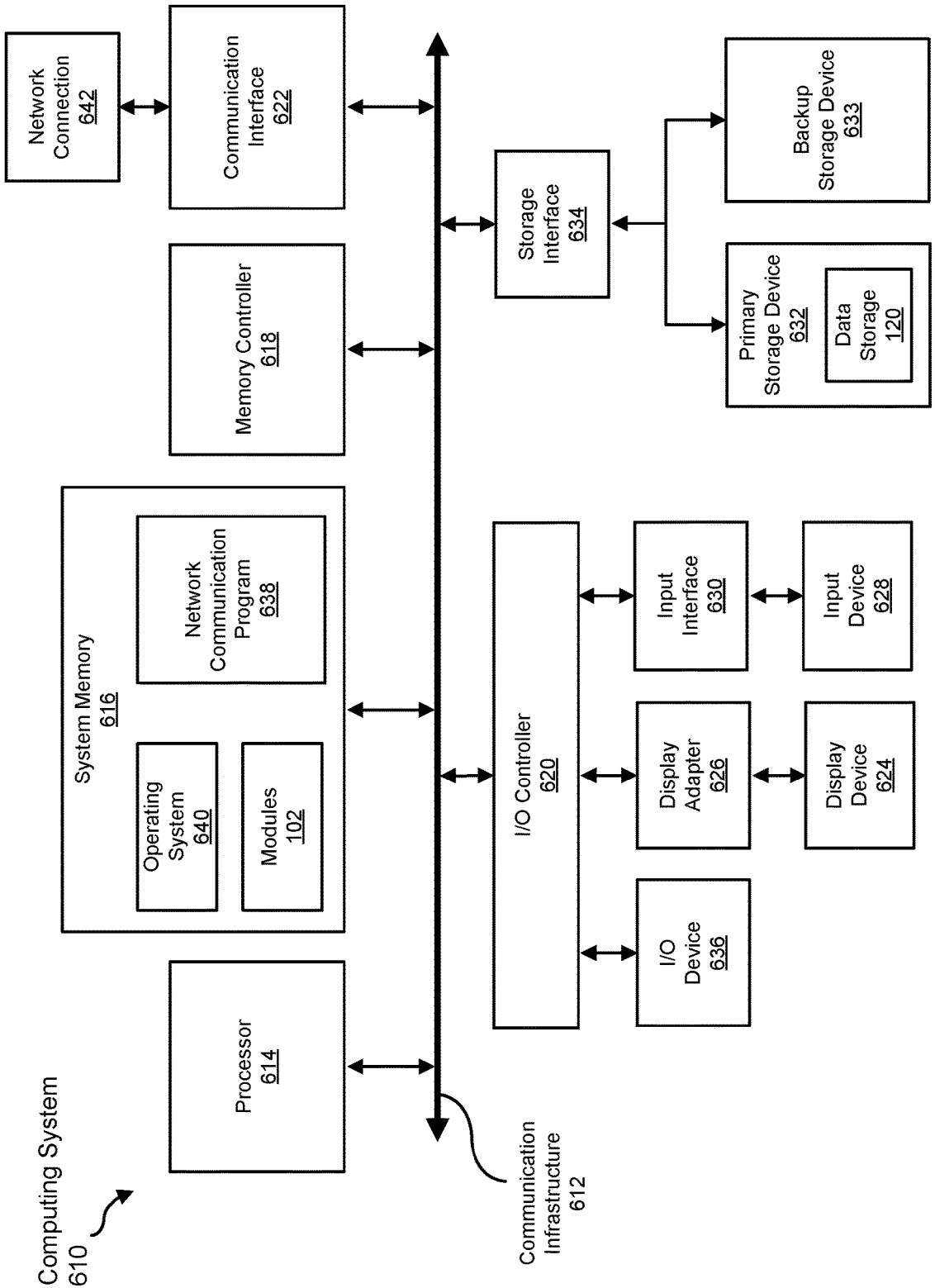
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
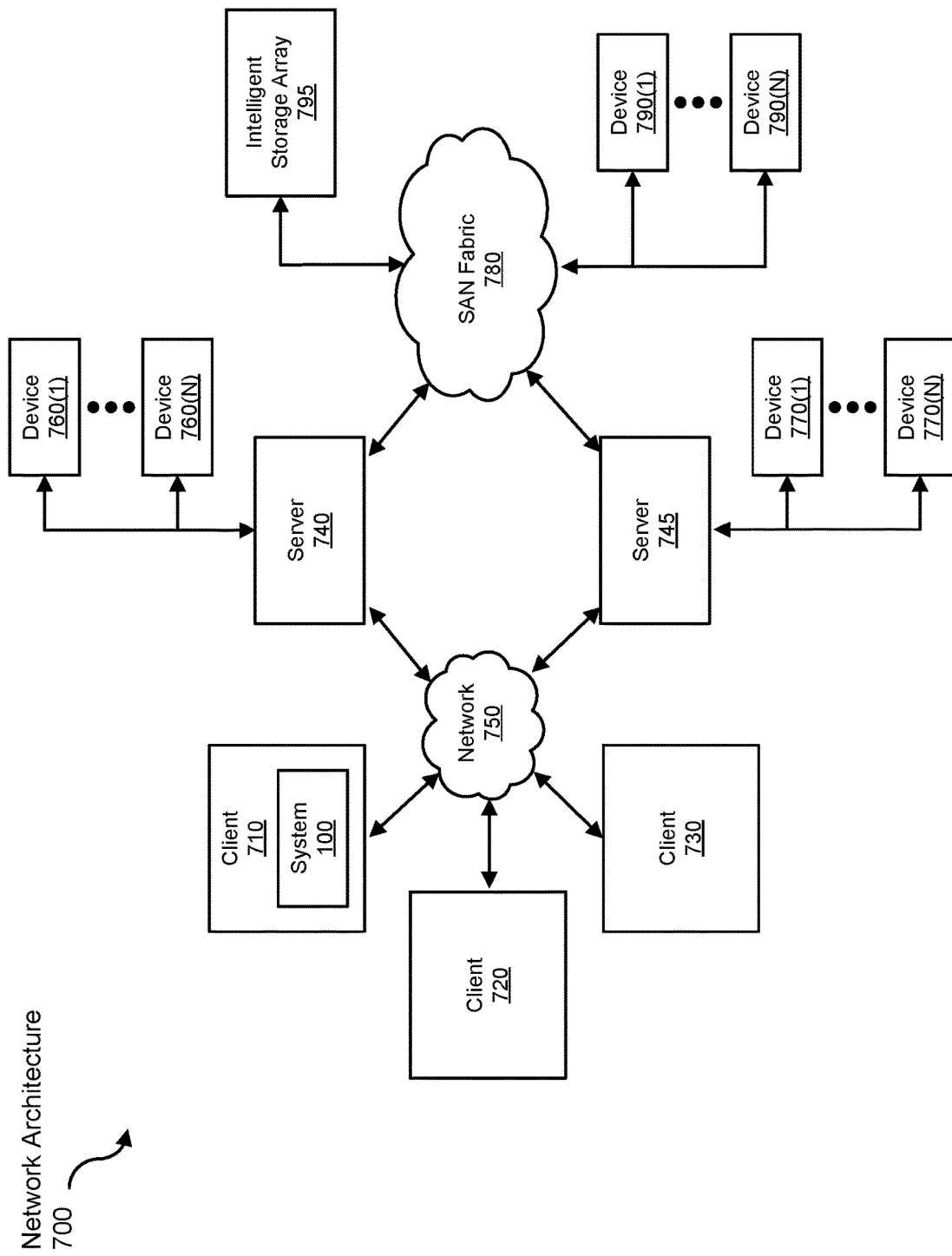
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for dynamically generating fingerprint signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically generating fingerprint signatures, at least a portion of the method being performed by one or more computing devices comprising at least one processor, the method comprising:
    detecting, by the one or more computing devices, data associated with one or more fingerprinting functions called in a target web page;
    associating, by the one or more computing devices and based on the data, each of one or more fingerprints generated by the fingerprinting functions with a corresponding action;
    identifying, by the one more computing devices and based on the data, callee information associated with each of the fingerprinting functions; and
    performing, by the one or more computing devices, a security action that protects against malicious activity by calculating a cryptographic hash of a list comprising the fingerprinting functions and the corresponding actions to generate a fingerprint signature for the target web page.

2. The computer-implemented method of claim 1, wherein detecting the data associated with the fingerprinting functions called in the target web page comprises detecting at least one of:
    hypertext markup language (HTML) elements associated with the fingerprinting functions; and
    HTML objects associated with the fingerprinting functions.

3. The computer-implemented method of claim 1, wherein detecting the data associated with the fingerprinting functions called in the target web page comprises tracking one or more application programming interfaces (APIs) utilized by the fingerprinting functions to dynamically modify the target web page.

4. The computer-implemented method of claim 1, wherein detecting the data associated with the fingerprinting functions called in the target web page comprises utilizing a dynamically generated resource tree for finding a connection between scripts in the target web page.

5. The computer-implemented method of claim 1, wherein associating, based on the data, the each of one or more the fingerprints generated by the fingerprinting functions with the corresponding action comprises:
    identifying a target function that utilizes any of the one or more of the fingerprints for a content manipulation action; and
    associating the target function with the content manipulation action.

6. The computer-implemented method of claim 1, wherein associating, based on the data, the each of one or more the fingerprints generated by the fingerprinting functions with the corresponding action comprises:
    identifying a target function that utilizes any of the one or more of the fingerprints for a redirection action; and
    associating the target function with the redirection action.

7. The computer-implemented method of claim 1, wherein associating, based on the data, the each of one or more the fingerprints generated by the fingerprinting functions with the corresponding action comprises:
  identifying a target function that performs a storage action for any of the one or more of the fingerprints; and
  associating the target function with the storage action.

8. The computer-implemented method of claim 1, wherein associating, based on the data, the each of one or more the fingerprints generated by the fingerprinting functions with the corresponding action comprises:
  identifying a target function that performs an action for sending any of the one or more of the fingerprints within a request parameter; and
  associating the target function with the action.

9. The computer-implemented method of claim 1, wherein identifying, based on the data, callee information associated with each of the fingerprinting functions comprises determining a domain name associated with a third-party callee based on the callee information.

10. The computer-implemented method of claim 1, wherein the malicious activity comprises a cloaking operation that delivers new content to a user of the target web page that is different than native content associated with the target web page.

11. The computer-implemented method of claim 1, wherein the fingerprint signature is at least one of:
  a device fingerprint signature; or
  a browser fingerprint signature.

12. A system for dynamically generating fingerprint signatures, the system comprising:
  at least one physical processor;
  physical memory comprising computer-executable instructions and one or more modules that, when executed by the physical processor, cause the physical processor to:
    detect, by a detection module, data associated with one or more fingerprinting functions called in a target web page;
    associate, by an association module and based on the data, each of one or more fingerprints generated by the fingerprinting functions with a corresponding action;
    identify, by an identification module and based on the data, callee information associated with each of the fingerprinting functions; and
    perform, by a security module, a security action that protects against malicious activity by calculating a cryptographic hash of a list comprising the fingerprinting functions and the corresponding actions to generate a fingerprint signature for the target web page.

13. The system of claim 12, wherein the detection module detects the data associated with the fingerprinting functions called in the target web page by detecting at least one of:
  hypertext markup language (HTML) elements associated with the fingerprinting functions; and
  HTML objects associated with the fingerprinting functions.

14. The system of claim 12, wherein the detection module detects the data associated with the fingerprinting functions called in the target web page by tracking one or more application programming interfaces (APIs) utilized by the fingerprinting functions to dynamically modify the target web page.

15. The system of claim 12, wherein the detection module detects the data associated with the fingerprinting functions called in the target web page by utilizing a dynamically generated resource tree for finding a connection between scripts in the target web page.

16. The system of claim 12, wherein the association module associates, based on the data, the each of one or more the fingerprints generated by the fingerprinting functions with the corresponding action by:
  identifying a target function that utilizes any of the one or more of the fingerprints for a content manipulation action; and
  associating the target function with the content manipulation action.

17. The system of claim 12, wherein the association module associates, based on the data, the each of one or more the fingerprints generated by the fingerprinting functions with the corresponding action by:
  identifying a target function that utilizes any of the one or more of the fingerprints for a redirection action; and
  associating the target function with the redirection action.

18. The system of claim 12, wherein the association module associates, based on the data, the each of one or more the fingerprints generated by the fingerprinting functions with the corresponding action by:
  identifying a target function that performs a storage action for any of the one or more of the fingerprints; and
  associating the target function with the storage action.

19. The system of claim 12, wherein the association module associates, based on the data, the each of one or more the fingerprints generated by the fingerprinting functions with the corresponding action by:
  identifying a target function that performs an action for sending any of the one or more of the fingerprints within a request parameter; and
  associating the target function with the action.

20. A non-transitory computer-readable medium comprising one or more computer-executable instructions that, when executed by at least one processor of a computing device, cause the computing device to:
  detect data associated with one or more fingerprinting functions called in a target web page;
  associate, based on the data, each of one or more fingerprints generated by the fingerprinting functions with a corresponding action;
  identify, based on the data, callee information associated with each of the fingerprinting functions; and
  perform a security action that protects against malicious activity by calculating a cryptographic hash of a list comprising the fingerprinting functions and the corresponding actions to generate a fingerprint signature for the target web page.

* * * * *